United States Patent [19]
Cuniberti

[11] Patent Number: 6,005,950
[45] Date of Patent: *Dec. 21, 1999

[54] RECORDER TO INSTRUMENT AMPLIFIER INTERFACE APPARATUS AND METHOD

[76] Inventor: John P. Cuniberti, 3559 Monterey Blvd., Oakland, Calif. 94619

[ * ] Notice: This patent issued on a continued prosecution application filed under 37 CFR 1.53(d), and is subject to the twenty year patent term provisions of 35 U.S.C. 154(a)(2).

[21] Appl. No.: 08/339,838

[22] Filed: Nov. 15, 1994

[51] Int. Cl.$^6$ ..................................................... H03G 3/00
[52] U.S. Cl. .............................................. 381/61; 381/118
[58] Field of Search ............................... 381/61, 64, 118, 381/111–115, 120; 360/65, 67

[56] References Cited

U.S. PATENT DOCUMENTS

| | | | |
|---|---|---|---|
| 3,602,824 | 8/1971 | Rusch ........................................ | 328/25 |
| 3,825,847 | 7/1974 | Hughes et al. ............................ | 330/13 |
| 3,848,092 | 11/1974 | Shamma ................................. | 179/1 VI |
| 3,943,564 | 3/1976 | Tushinsky ................................. | 381/24 |
| 3,978,524 | 8/1976 | Gordon et al. .......................... | 381/118 |
| 4,035,582 | 7/1977 | Okamoto ................................. | 179/1 J |
| 4,437,189 | 3/1984 | Newman ................................... | 381/91 |
| 4,672,671 | 6/1987 | Kennedy ................................... | 391/61 |
| 4,805,728 | 2/1989 | Carter et al. ............................ | 181/141 |
| 4,998,828 | 3/1991 | Sakata ....................................... | 381/63 |
| 5,343,159 | 8/1994 | Butler ...................................... | 381/120 |

FOREIGN PATENT DOCUMENTS

| | | | |
|---|---|---|---|
| 2623931 | 2/1989 | France ..................................... | 381/119 |
| 5826301 | 2/1983 | Japan ........................................ | 381/26 |

OTHER PUBLICATIONS

Howard Tremaine, "Audio Cyclopedia", 1959, pp. 414–417, 432–437.

Terrell et al., "IC50 Guitar Amplifier", Practical Electronics, vol. 11, No. 12, Dec. 1975.

*Primary Examiner*—Forester W. Isen
*Assistant Examiner*—Xu Mei
*Attorney, Agent, or Firm*—Michael L. Louie; Beyer & Weaver, LLP

[57] ABSTRACT

Methods and apparatus for reducing replays in the recording of live musical performances, and for other recording purposes, are disclosed. The apparatus includes novel audio frequency electrical signal processing devices which can be incorporated in re-recording systems by means of which "flat" recordings of original "live" instrumental and musical performances are re-recorded via effects boxes and instrument amplifiers which are different or differently set than the equipment used in making the original "live" recording, and thus the resulting re-recordings have the same apparent sound quality as recordings originally made "live" through the same effects boxes and instrument amplifiers set in the same way. The disclosed signal processing device of the invention includes an output trim control and a ground lift switch. Also disclosed are re-recording systems of the invention, and re-recording methods of the invention.

20 Claims, 3 Drawing Sheets

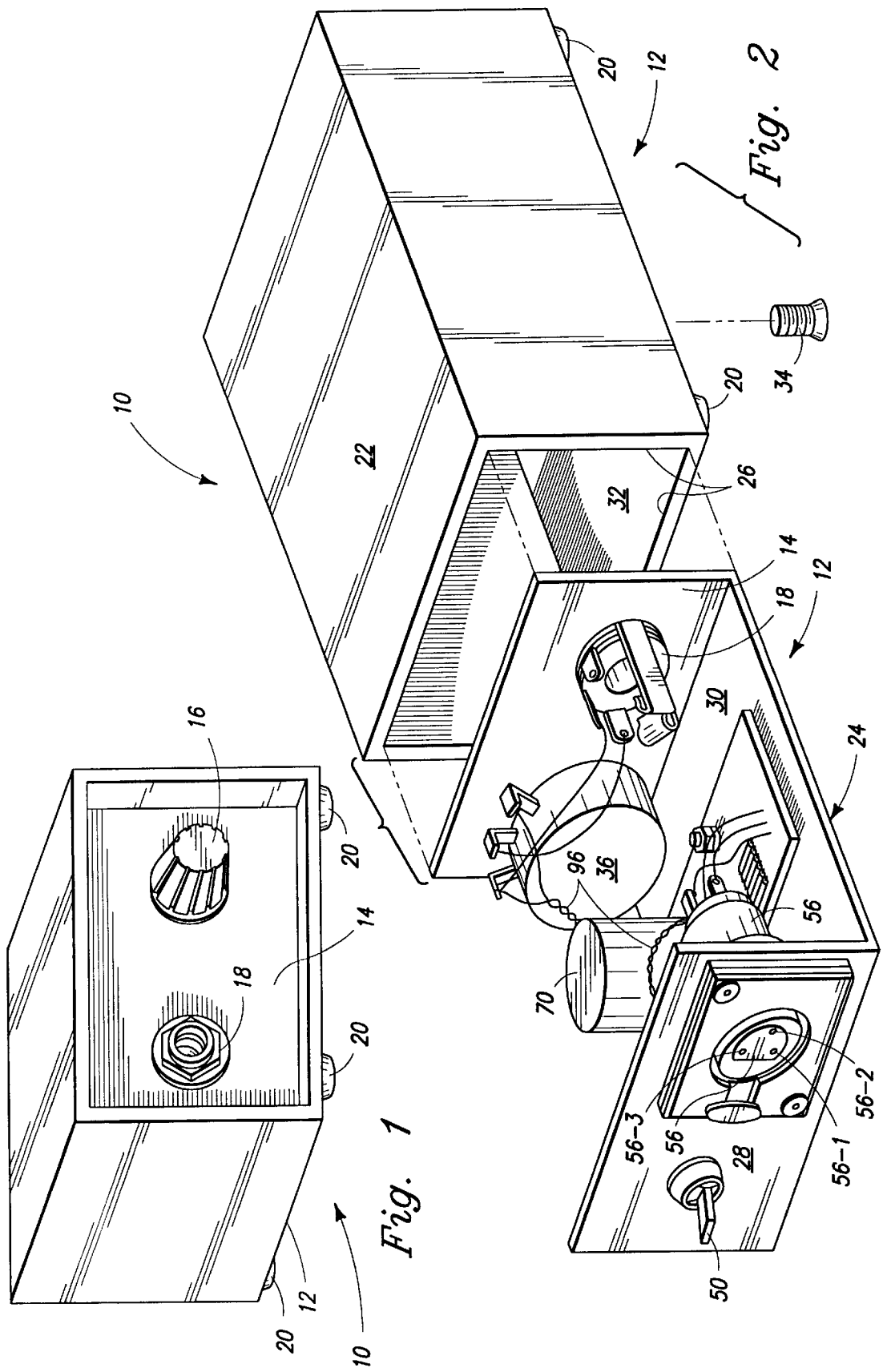

RECORDER TO INSTRUMENT AMPLIFIER INTERFACE APPARATUS AND METHOD

BACKGROUND OF THE INVENTION

1. Field of the Invention

My present invention relates to the recording of live musical performances, and more particularly to methods and apparatus for reducing replays in the recording of live musical performances, and for other recording purposes.

2. Description of the Prior Art

A typical prior art recording system for the recording of a live performance on an electric musical instrument is comprised of a matching transformer connected to the output terminals of the electric musical instrument, a recording/playback console receiving the output signals from the matching transformer, a tape recorder connected to output and input terminals of the recording/playback console, and monitoring speakers receiving output signals from output terminals of said recording/playback console, as modified for balance and equalization by manipulating controls of said recording/playback console.

Other prior art recording systems used for the same purpose substitute for the matching transformer an instrument amplifier, a loudspeaker, a microphone and a recording/playback console. In these other prior art recording systems output terminals of the electric musical instrument being used by the performer are connected to input terminals of the instrument amplifier, which in turn drives the loudspeaker. The sound produced by the loudspeaker is picked up by the microphone, and output terminals of the microphone are connected to input terminals of the recording/playback console.

In making recordings with such prior art recording systems, the performer is required to repeat and frequently re-repeat a musical piece or passage while the recording engineer adjusts microphone placement, equalization and recording level by means of the controls of the recording/playback console in order to produce the desired recording qualities.

Such repetitions of the same particular piece or passage by the performer are undesirable, given the temperament of many recording artists, and the cost of the performing time of major recording artists and studio musicians.

It is believed that the documents listed in the Information Disclosure Statement filed herewith contain information which is or might be considered to be material to the examination hereof.

A copy of each document listed in said Information Disclosure Statement is supplied to the United States Patent and Trademark Office herewith.

No representation or admission is made that any of the documents listed in said Information Disclosure Statement is part of the prior art, or that no more pertinent information exists.

The term "prior art" as used herein or in any statement made by or on behalf of applicant means only that any document or thing referred to as prior art bears, directly or inferentially, a date which is earlier than the effective filing date hereof.

SUMMARY OF THE INVENTION

Accordingly, it is an object of my present invention to reduce the number of repetitions of a particular piece or passage required of a recording artist at a recording session to a minimum, or to completely eliminate such repetitions.

Another object of my present invention is to provide means whereby a recording of a live performance may be made with little or no manipulation of the recording console controls, etc., by the recording engineer, whereafter the resulting substantially unmodified recording may be played back in the absence of the recording artist, and the recording engineer may then manipulate the controls of the re-recording system of the invention to produce the desired recording qualities.

Yet another object of my present invention is to provide methods of making recordings of live performances on electrical musical instruments, e.g., electric guitars, in the practice of which methods recordings of live performances can be made with little or no manipulation of the console controls by the recording engineer in the presence of the recording artist.

A further object of my present invention is to provide methods of making recordings of live performances on electrical musical instruments, in the practice of which methods the recording engineer replays on a re-recording system of the invention a substantially unmodified recording which was made at a live recording session, in the presence of the recording artist, and manipulates the console controls of the re-recording system of the invention in order to produce a modified recording having the desired recording qualities.

A yet further object of my present invention is to provide a re-recording system whereby a recording engineer can modify a substantially unmodified recording previously made at a live recording session, and thus can produce a modified recording having the desired recording qualities, while at the same time minimizing the performing time of the recording artist.

Another object of my present invention is to provide signal processing devices which allow repeated playbacks of a recorded performance back into an instrument amplifier so that engineers and producers can adjust tone controls, position or change microphones, etc., without the need of the artist to repeat his or her performance.

Another object of my present invention is to provide signal processing devices which allow an artist or instrument amplifier sales person to demonstrate different makes of instrument amplifiers without the need of repeated playing of the instrument by the artist or sales person.

Another object of my present invention is to provide signal processing devices which allow professional studio signal processing equipment to be used in between the instrument and its amplifier.

Another object of my present invention is to provide signal processing devices which allow instrument processing equipment to be used anytime after the recording has been made.

Another object of my present invention is to allow the output signals of professional recording equipment with +4 dbm low impedance line level outputs to be injected into −50 dbm high input impedance instrument amplifiers with correct impedance and level matching.

Yet another object of my present invention is to permit the recording engineer to change instrument amplifier make, tone settings, and effects at any time after a live recording session.

A further object of my present invention is to provide methods and apparatus whereby recording engineers and producers can experiment with microphone placement and room ambiance without requiring the recording artist to repeat frequently and re-repeat particular pieces or passages which are to be recorded.

A yet further object of my present invention is to provide audio frequency electrical signal processing devices which can be interconnected with well known and generally available items of recording studio equipment to provide re-recording systems whereby substantially unmodified recordings made at live recording sessions by recording artists playing electrical musical instruments can be subsequently modified, in the absence of the recording artist, to produce desired recording qualities.

Other objects of my present invention will in part be obvious and will in part appear hereinafter.

My present invention, accordingly, comprises the several steps and the relation of one or more of such steps with respect to each of the others, and the apparatus embodying features of construction, combinations of elements, and arrangements of parts which are adapted to affect such steps, all as exemplified in the following disclosure, and the scope of my present invention will be indicated in the claims appended hereto.

In accordance with a principal feature of my present invention an audio frequency electrical signal processing device of the invention is comprised of an audio transformer to one winding of which is connected an XLR female line input connector in the form of a panel receptacle with three contacts, and to the other winding of which is connected a ¼-inch audio jack.

In accordance with another principal feature of my present invention the fixed resistive element or card of a potentiometer is connected across said other winding of said audio transformer, and the movable contact of said potentiometer is connected to one terminal of said audio jack, said potentiometer functioning as an output trim control.

In accordance with yet another principal feature of my present invention the outer terminal (shell) of said audio jack is the ground terminal of said signal processing device and is directly conductively connected to a first terminal of a single pole, single throw ground lift switch; a second terminal of said ground lift switch being directly conductively connected to a terminal of said XLR female line input connector which is not connected to said one winding of said audio transformer.

In accordance with a further principal feature of my present invention said signal processing device includes a conductive housing and said XLR female line input connector is electrically isolated from said housing, except that when said ground lift switch is closed the terminal of said XLR female line input connector which is not connected to said one winding of said audio transformer is directly conductively connected to said housing.

In accordance with a yet further principal feature of my present invention two terminals of a resistive matching network are connected, respectively, to the terminals of said one winding of said audio transformer, and the other two terminals of said resistive matching network are connected, respectively, to the terminals of said XLR female line input connector which are not connected to said ground lift switch.

In accordance with another principal feature of my present invention a re-recording system of my present invention is comprised of a signal processing device of my invention as abovedescribed, a first recording and playback device, an instrument amplifier, a loudspeaker driven by said instrument amplifier, and a microphone supplying its electrical output signals to a second recording and playback device.

For a fuller understanding of the nature and objects of my present invention, reference should be had to the following detailed description, taken in connection with the accompanying drawings.

BRIEF DESCRIPTION OF THE DRAWINGS

FIG. 1 is a perspective view of an audio frequency electrical signal processing device of the first preferred embodiment of my invention;

FIG. 2 is a pictorial view of the signal processing device of the first preferred embodiment of my invention as shown in FIG. 1, partially disassembled;

DESCRIPTION OF THE PREFERRED EMBODIMENTS

Figure 3:
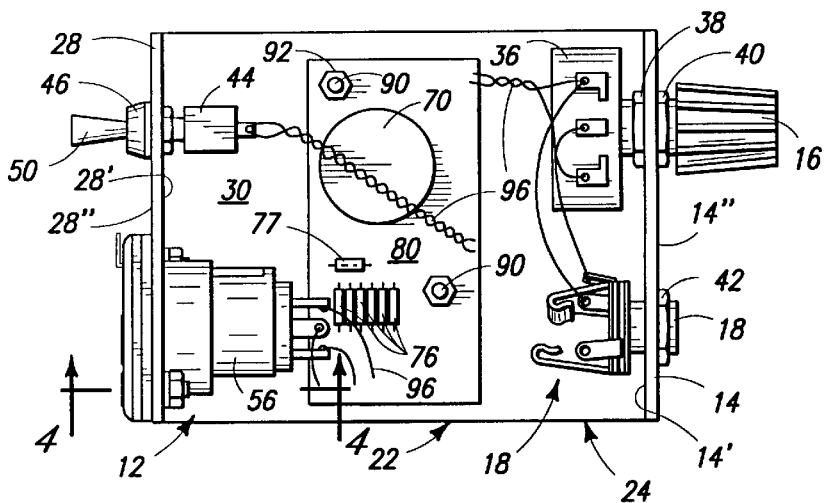
FIG. 3 is a plan view of the chassis portion of the signal processing device of the first preferred embodiment of my present invention.

Referring now to FIG. 1, there is shown an audio frequency electrical signal processing device 10 of the first preferred embodiment of my present invention.

As seen in FIG. 1, processing device 10 is comprised of a housing 12 on one end wall 14 of which is mounted a manually rotatable control knob 16 and a ¼-inch audio jack 18.

Housing 12 is a commercially available extruded aluminum electrical equipment box the dimensions of which in the preferred embodiment are five inches (length), three inches (width), and two inches (height).

As also seen in FIG. 1, housing 12 is preferably provided with suitable scratch preventing feet 20.

All of the exterior surfaces of housing 12 are preferably anodized and coated to provide a matt finish.

Referring now to FIG. 2, it will be seen that housing 12 is comprised of a shell 22 and a chassis 24.

Chassis 24 is close-fittingly, slidably receivable in the central passage 26 of shell 22, and is slidable from end to end of shell 22, in one end and out the other. Chassis 24 is comprised of a first end wall 14, a second end wall 28 and a floor 30, all three of which are integrally joined together.

A tapped hole (not shown) extends through the central portion of floor 30, and a clearance hole (not shown) extends through the central portion of floor 32 of shell 22. The outer end of said clearance hole is countersunk to accommodate the head of a flat head cap screw 34.

Said tapped hole and said clearance hole are so located on their respective floors 30, 32 that they are axially aligned when chassis 24 is located at a predetermined position in passage 26.

When chassis 24 is so located in passage 26 of shell 22, cap screw 34 is passed through said clearance hole and threadedly engaged with said tapped hole, and thus chassis 24 is fixed within passage 26.

When chassis 24 is thus affixed to shell 22, within passage 26, wall 14 is fixedly located near the first outer end of passage 26, and wall 28 is fixedly located near the second outer end of passage 26.

As seen in FIG. 3, a potentiometer 36 is mounted on the inner side 14' of wall 14.

More particularly, the threaded shaft tube of potentiometer 36 passes through a close-fitting hole (not shown) in wall 14, and is maintained in said close-fitting hole by means of two nuts 38, 40 and their associated lock washers (FIG. 3) in the well known manner.

The movable contact of potentiometer 36 is movable over the fixed resistive element thereof by means of manually operable knob 16.

Similarly, audio jack 18 is mounted on wall 14 by passing its threaded mounting tube through a close-fitting hole (not shown) in wall 14, and then threadedly engaging a nut 42 with the threads of said mounting tube, and tightening nut 42 against the outer face 14" of wall 14.

As yet further seen in FIG. 3, a single pole, single throw toggle switch 44 is mounted on the inner face 28' of wall 28 in the well known manner, the threaded mounting tube of switch 44 passing through a close-fitting hole in wall 28, and switch 44 being firmly mounted on wall 28 by means of a suitable nut 46, in the well known manner.

Thus, it will be seen that manual actuator 50 of switch 44 projects outwardly from the outer surface 28" of wall 28, whereby switch 44 can be manually operated into either switch position (closed or open) as desired.

Figure 4:
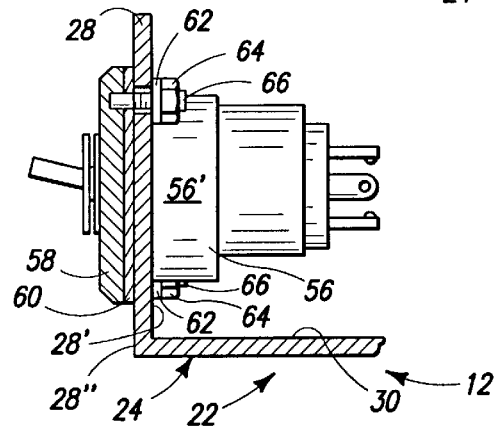
FIG. 4 is a partial, elevational cross-sectional view of the chassis of the signal processing device of my present invention as shown in FIG. 3, taken on plane 4—4 of FIG. 3.

As may be seen by comparison of FIGS. 1, 3 and 4, an XLR female connector (receptacle) 56 is also mounted on wall 28. It is to be understood, however, that connector 56 is electrically insulated from wall 28.

As particularly seen in FIG. 4, a plate 60 of insulating material is interposed between the rear face of the facia plate 58 of switch 50 and the front face 28" of wall 28.

Further, insulating material washers 62 are interposed between mounting nuts 64 and the rear face 28' of wall 28.

Mounting bolts 66 of switch 50 and body 56' of switch 56 all pass through holes in conductive wall 28 which are considerably larger than their associated parts.

Thus, it will be seen by those having ordinary skill in the art, informed by the present disclosure, that the housing of switch 50 is electrically isolated with respect to conductive wall 28, and indeed with respect to the entire housing 12.

Returning to FIG. 3, it will be seen by those having ordinary skill in the art that a plurality of circuit components such as audio transformer 70, capacitor 77 and resistors 76 are mounted on a plate 80 of insulating material.

Figure 5:
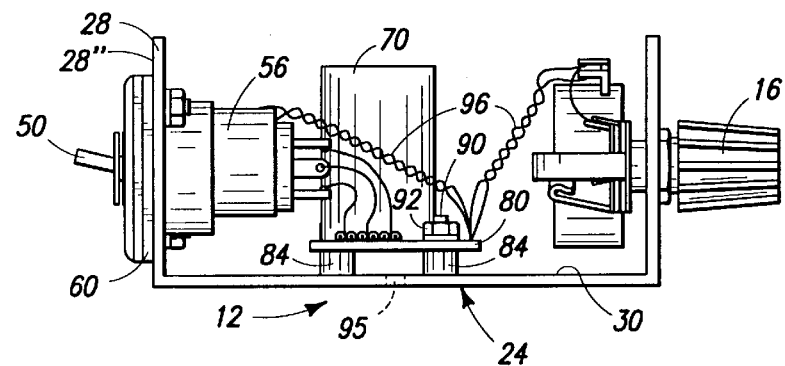
FIG. 5 is an elevational view of the chassis of the signal processing device of the first preferred embodiment of my invention shown in FIG. 3, taken from the front of the device as seen in FIG. 3.
Figure 6:
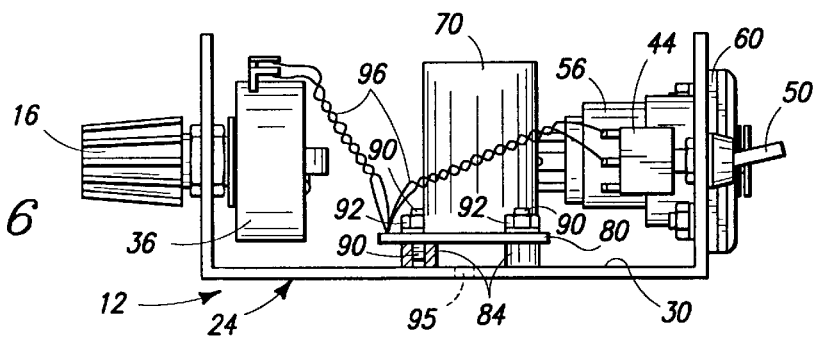
FIG. 6 is an elevational view of the chassis of the signal processing device of the first preferred embodiment of my present invention as shown in FIG. 3, taken from the back of the device as seen in FIG. 3.

As best seen by comparison of FIGS. 3, 5 and 6, insulating plate 80 is mounted on the upper ends of a pair of support members 84.

Each support member 84 is a cylindrical member through which passes a coaxial bore.

Both support members 84 bear upon the floor 30 of chassis 24, and insulating plate 80 bears upon the upper ends of support members 84.

As may also be seen in FIG. 6, each support member 84 defines an axial passage through which a cap screw 90 passes close-fittingly.

Each cap screw 90 extends through floor 30, through the close-fitting axial passage of its associated support member 84, and then through plate 80, and projects above the upper surface of plate 80.

A nut 92 is engaged with the upper end of each screw 90, remote from the head thereof, and is taken up against the upper surface of plate 80, thus securing each support member 84 to floor 30, and securing plate 80 to the top of its associated support members 84.

As also seen in FIGS. 3, 5 and 6, the electrical components of signal processing device 10 are interconnected by means of wires 96, which are shown in part only for clarity of illustration.

As also seen in FIGS. 5 and 6, the tapped hole 95 in floor 30 which receives the point of screw 34 is located below plate 80.

Figure 7:
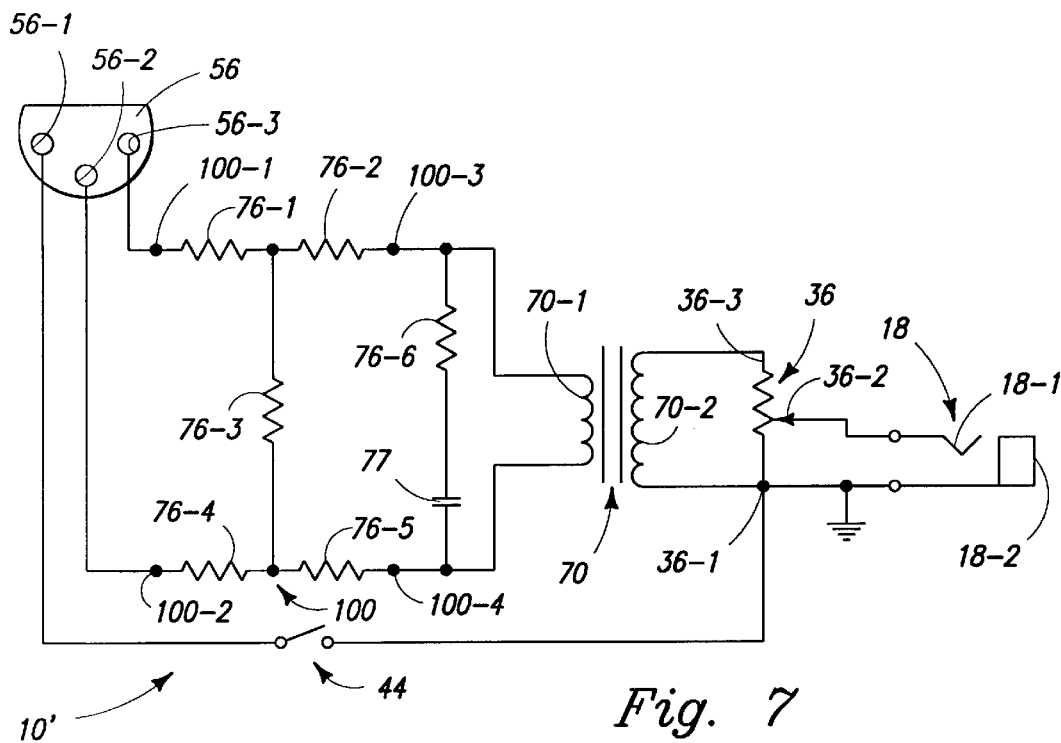
FIG. 7 is a schematic circuit diagram of the signal processing device of the first preferred embodiment of my invention.

Referring now to FIG. 7, there is schematically represented the circuit 10' of the first preferred embodiment of my present invention.

In the known manner, female XLR connector 56 (shown in FIGS. 2, etc.) is comprised of three prong receptacles 56-1, 56-2, 56-3, each of which is adapted to receive one of the prongs of an associated male XLR connector (jack).

In circuit 10' a voltage reduction network 100 is comprised of resistors 76-1, 76-2, 76-3, 76-4, 76-5, and matching network 100 has two input terminals 100-1, 100-2 and two output terminals 100-3, 100-4.

Prong receptacles 56-2, 56-3 of XLR connector 56 are directly conductively connected, respectively, to matching network input terminals 100-2, 100-1.

In the preferred embodiment of my present invention resistors 76-1 and 76-4 are 174 ohm resistors, resistors 76-2 and 76-5 are 113 ohm resistors, and resistor 76-3 is a 338 ohm 32 resistor. Resistor 76-6 is a 100 ohm resistor and capacitor 77 is a 96 picofarad capacitor. Also, transformer 70 is a 500 ohm/30 kilohm audio transformer, such as a UTC 0-10 audio transformer. Potentiometer 36 (FIG. 7) is a 50 kilohm potentiometer. Jack 18 (FIG. 7) is a female ¼-inch mono phone jack. Terminal 36-1 of the fixed resistance element of potentiometer 36 is directly conductively connected to ground, i.e., to housing 12 (FIG. 1).

As also seen in FIG. 7, the movable contact 36-2 of potentiometer 36 is directly conductively connected to the inner contact 18-1 of mono phone jack 18, and the shell contact 18-2 of mono phone jack 18 is directly conductively connected to ground, i.e., to housing 12.

As further seen in FIG. 7, single pole, single throw toggle switch 44 is connected between prong receptacle 56-1 of XLR connector 56 and ground, i.e., housing 12. Terminals 36-1, 36-3 of potentiometer 36 are connected, respectively, to the terminals of secondary winding 70-2 of audio transformer 70, and primary winding 70-1 of audio transformer 70 is connected between terminals 100-3 and 100-4 of matching network 100.

Figure 8:
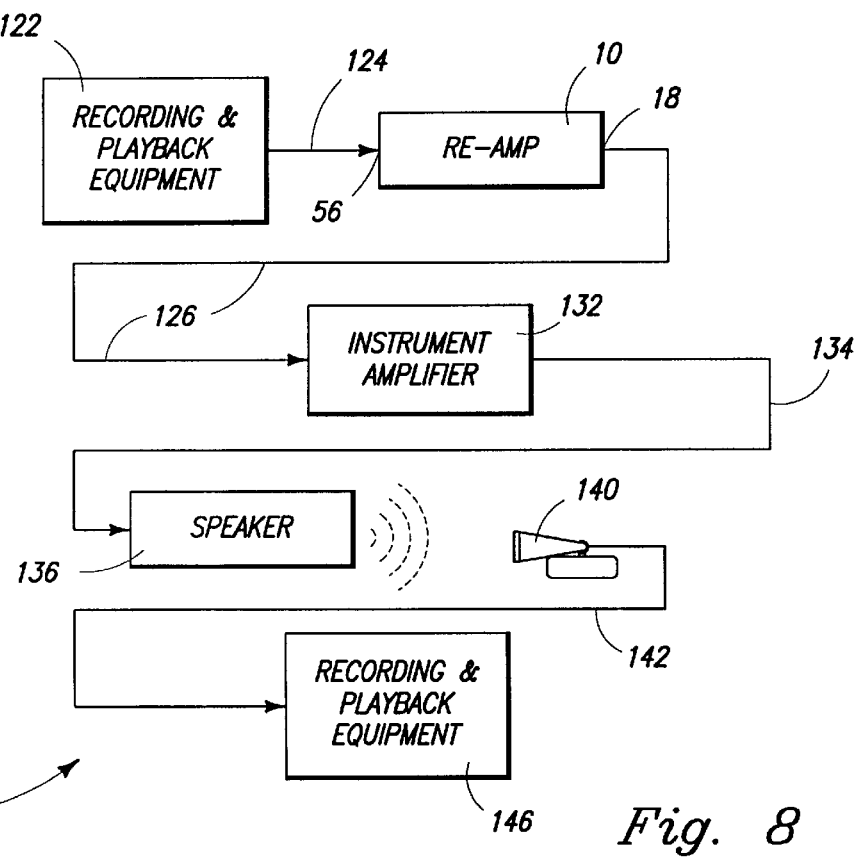
FIG. 8 is a schematic block diagram of a re-recording system of my present invention, incorporating a signal processing device of the first preferred embodiment of my present invention.

Referring now to FIG. 8, there is shown a novel re-recording system 120 of the first preferred embodiment of my present invention.

Re-recording system 120 is comprised of a recording and playback device 122 of well known type, e.g., a Studer Multitrack Tape Recorder, Model A-800, which is connected by an audio cable 124 of well known type to XLR input connector 56 of signal processing device 10 of the first preferred embodiment of my present invention. Alternatively, playback device 122 may also include a recording console, e.g., a Neve Model 8068 Recording Console.

An audio cable 126 of well known type is connected between output jack 18 of signal processing device 10 and an input connector of an instrument amplifier 132, e.g., a Fender Twin Reverb Guitar Amplifier.

A speaker cable or cable set 134 of well known type may be connected between an output connection of instrument amplifier 132 and input terminals of a high quality loudspeaker 136 of well known type. Alternatively, speaker 136 may be a part of instrument amplifier 132, as in the case of the above-mentioned Fender Guitar Amplifier.

As also seen in FIG. 8, re-recording system 120 further comprises a high quality microphone 140, e.g., a Shure SM-57 Microphone, which is so juxtaposed to loudspeaker 136 as to optimally pick up the sounds emanating from loudspeaker 136.

Microphone 140 is connected by means of a microphone cable 142 of well known type to an input connector of a second recording and playback device 146, which consists of a tape recorder and a recording console as above-described.

Typical Method of Using a Re-Recording System of the Invention

Play back a previously recorded guitar, bass, or synthesizer track by means of the recording and playback equipment 122 of FIG. 8.

As you listen to the guitar, bass, or synthesizer performance emanating from loudspeaker 136, adjust the trim control (knob 16) of signal processing device 10 and the manually operable adjustment controls of instrument amplifier 132 for the desired sound reproduction quality.

When the desired reproduced sound quality has been achieved by this process of adjustment, signal processing device 10 has been adjusted to match the characteristics of the electrical instrument by means of which the previously recorded track was originally made. Instrument amplifier 132 will then react as if the input signal to instrument amplifier 132 derived from audio cable 126 were being derived directly from the electric instrument originally used in recording the previously recorded track.

The said previously recorded guitar, bass, or synthesizer track can then be audibly reproduced via speaker 136, and the sound thus emanating from speaker 136 re-recorded via microphone 140, microphone cable 142 and recording and playback equipment 146.

Impedance and Level Matching With the Signal Processing Device of the Invention

As will now be evident to those having ordinary skill in the art, informed by the present disclosure, the signal processing device of the first preferred embodiment of the present invention makes it possible to provide correct impedance and level matching in such manner that signals from professional recording equipment with 600 ohm +4 dbm line level outputs can be injected into high input impedance instrument amplifiers with correct impedance and level matching.

Applications of Signal Processing Devices Embodying the Present Invention

Many applications of signal processing devices embodying the present invention will occur to those having ordinary skill in the art, when informed by the present disclosure and given the opportunity to utilize signal processing devices embodying the invention. The following are some of the applications. It is to be understood, however, that the following list of applications is by no means exhaustive.

1. As explained hereinabove, changes in instrument amplifier make, tone settings, and effects (whether produced by stand-alone or built-in effects boxes), may be compensated for during re-recording of program material originally recorded with different amplifier makes or tone settings, or different effects boxes than those used during the recording. In view of experience with signal processing devices of the present invention, it is recommended that a flat, direct safety track be recorded during the original live recording session. It is to be noted, however, that the use of such a flat, direct safety track is not always necessary for best results.

2. Original recordings may be made without instrument amplifiers during a tracking session if space or leakage is a problem, and thus the use of signal processing devices of the present invention is highly desirable for late night, home A-DAT recording. When such a late night, home A-DAT recording is reviewed on the next day, it is necessary merely to replay the previous night's performance via a signal processing device embodying the invention, adjusted as described above, in order to produce recordings which have the desirable sound qualities of recordings made during a "live" recording session when both the performer and the recording engineer are present together, the recording engineer manipulating the amplifier controls and the controls of the effects box in the manner in which those controls were actually manipulated on the next day.

3. High impedance effects boxes of the kind used in making live electrical instrument recordings may be incorporated into re-recording systems of my present invention by connecting a signal processing device of the invention, a selected high impedance effects box and a matching transformer between an output of the tape recorder being used for re-recording and the recording console being used for re-recording.

4. Sound engineers and recording producers can experiment with microphone placement and room ambiance without requiring that the artist repeatedly replay the instrument selection which is to be incorporated into the recording. In so doing it is necessary merely to record a scratch direct signal on tape and feed it to the artist amplifier as many times as desired while experimenting with microphone placement and room ambiance conditions.

5. It is possible by the use of a signal processing device of the present invention to insert the effects of studio preamplifiers, equalizers, effects boxes, and dynamics control units before the instrument amplifier of the recording system.

6. Signal processing devices of the invention can be used in applying guitar, vocal, or any other signals to a Leslie speaker, provided that a Leslie preamplifier peddle is available.

7. Trade show or music store demonstrations of instrument amplifiers and effects units can be made with a pre-recorded tape instead of a live player.

It will thus be seen that the objects set forth above, among those made apparent from the preceding description, are efficiently attained, and since certain changes may be made in the above constructions and the method carried out thereby without departing from the scope of my present invention, it is intended that all matter contained in the above description or shown in the accompanying drawings shall be interpreted as illustrative only, and not in a limiting sense.

It is also to be understood that my invention embraces other audio devices, e.g., recording consoles, into the housings of which an audio frequency electrical signal processing circuit of my present invention is incorporated.

It is also to be understood that the following claims are intended to cover all of the generic and specific features of my invention hereindescribed, and all statements of the

What I claim as new and desire to secure to myself by Letters Patent is:

1. A re-recording assembly for re-recording and modifying a first sound track recording of a live audio performance comprising:

an audio recording playback device producing from said first sound track recording of the live audio performance a relatively high level, relatively low impedance audio signal representative of the recorded live audio performance;

an audio interface device, including a transformer and a potentiometer, configured to adjust said high level, low impedance audio signal to a relatively low level, relatively high impedance audio signal, representative of the modified live audio performance and in a manner substantially reproducing the sound quality and audio characteristics of the live audio performance;

an audio amplifier adapted to receive said low level, high impedance audio signal from said interface device;

a loudspeaker coupled to said audio amplifier to reproduce the modified live audio performance;

a microphone device positioned proximate said loudspeaker and generating a microphone audio signal responsive to and representing the modified live audio performance emanating from the loudspeaker; and a recording apparatus configured to record the microphone audio signal representing the modified live audio performance onto a second sound track.

2. The re-recording assembly as defined in claim 1 wherein, the audio recording playback device is adapted to generate a high level, low impedance audio signal representative of the live audio performance on the order of about 600 ohm, +4 dbms.

3. The method as defined in claim 2 wherein, said amplifier device is configured to receive low level, high impedance audio signals on the order of about at least 10,000 ohm, −50 dbms.

4. The method as defined in claim 3 wherein, said amplifier device is provided by a musical instrument amplifier.

5. A method of modifying a sound track recording of a live audio performance comprising the steps of:

producing from said sound track recording of the live audio performance a relatively high level, relatively low impedance audio signal representative of the recorded live audio performance;

adjusting said high level, low impedance audio signal to a relatively low level, relatively high impedance audio signal, representative of the modified live audio performance and in a manner substantially reproducing the sound quality and audio characteristics of the live audio performance; and inputting said relatively low level, high impedance audio signal through an amplifying device configured to receive relatively low level, high impedance audio signals for amplification of said relatively low level, high impedance audio signal.

6. The method as defined in claim 5 further including the step of:

reproducing the modified live audio performance, from the amplified high impedance audio signal, through at least one loudspeaker.

7. The method as defined in claim 6 further including the step of:

recording the modified live audio performance onto a second sound track recording.

8. The method as defined in claim 7 wherein, said recording step is performed by positioning at least one microphone at a desired location proximate an audio pathway of said loudspeaker as the modified live audio performance emanates from the loudspeaker.

9. The method as defined in claim 5 wherein, said producing step is performed by recording and playback equipment generating a high level, low impedance audio signal representative of the live audio performance on the order of about 600 ohm, +4 dbms.

10. The method as defined in claim 9 wherein, said amplifier device is configured to receive low level, high impedance audio signals on the order of about at least 10,000 ohm, −50 dbms.

11. The method as defined in claim 10 wherein, said amplifier device is provided by a musical instrument amplifier.

12. The method as defined in claim 5 wherein, said adjusting step is performed by an interface apparatus including an audio transformer and a potentiometer.

13. The method as defined in claim 12 wherein, said adjusting step is further performed by manipulating the potentiometer to selectively alter the sound quality of the modified live audio performance as it emanates from the loudspeaker.

14. The method as defined in claim 13 further including the step of:

adjusting the amplifier device to further selectively alter the sound quality of the modified live audio performance as it emanates from the loudspeaker.

15. The method as defined in claim 14 further including the step of:

reproducing the modified live audio performance, from the amplified high impedance audio signal, through at least one loudspeaker.

16. The method as defined in claim 15 further including the step of:

recording the modified live audio performance onto a second sound track recording.

17. The method as defined in claim 16 wherein, said recording step is performed by positioning at least one microphone at a desired location proximate an audio pathway of said loudspeaker as the modified live audio performance emanates from the loudspeaker.

18. The method as defined in claim 13 wherein, said producing step is performed by recording and playback equipment generating a high level, low impedance audio signal representative of the live audio performance on the order of about 600 ohm, +4 dbms.

19. The method as defined in claim 18 wherein, said amplifier device is configured to receive low level, high impedance audio signals on the order of about at least 10,000 ohm, −50 dbms.

20. The method as defined in claim 19 wherein, said amplifier device is provided by a musical instrument amplifier.

* * * * *